G. BLAKE.
Harvester Rake.
No. 81,978.
Patented Sept. 8, 1868.
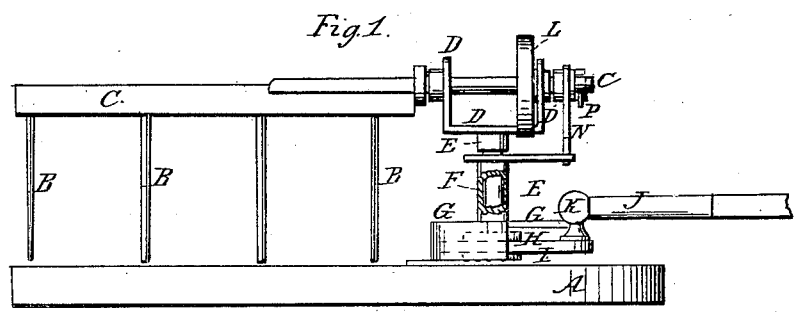
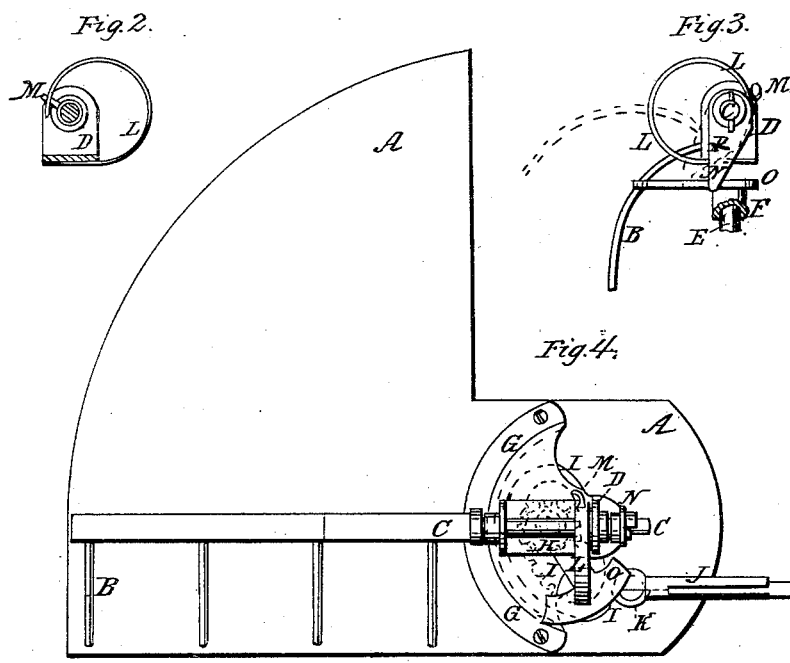
Witnesses.
Wm A. Morgan
G. C. Colton
Inventor.
George Blake
per Munn & Co
Attys.

UNITED STATES PATENT OFFICE.

GEORGE BLAKE, OF WHITBY, CANADA, ASSIGNOR TO HIMSELF AND THOMAS CONNAR, OF SAME PLACE.

IMPROVEMENT IN HARVESTER-RAKES.

Specification forming part of Letters Patent No. 81,978, dated September 8, 1868.

*To all whom it may concern:*

Be it known that I, GEORGE BLAKE, of Whitby, in the county of Ontario, Province of Ontario, and Dominion of Canada, have invented a new and useful Improvement in Rakes for Harvesters; and I do hereby declare that the following is a full, clear, and exact description thereof, which will enable others skilled in the art to make and use the same, reference being had to the accompanying drawing, forming part of this specification, in which—

Figure 1 is a side view of my improved self-raking attachment for harvesters. Fig. 2 is a detail sectional view of the same, taken through the line *x x*, Fig. 1. Fig. 3 is a detail view of the device for tripping the rake. Fig. 4 is a top view of the same.

Similar letters of reference indicate corresponding parts.

My invention has for its object to furnish an improved self-raking attachment for reaping-machines which shall be simple and inexpensive in construction, and which can be made light, so as to be worked with a rapid motion, and without any jar, thus avoiding all thrashing out of the grain and all liability of breakage.

It consists in the construction and combination of the various parts, as hereinafter more fully described.

A represents the platform, upon which the grain falls from the sickle, and from which it is swept by the rake-teeth B. The rake-teeth B are attached to the rake-head C, the inner end of which works in bearings in the two-armed bracket D, rigidly attached to the upper end of the vertical shaft E. The shaft E has a shoulder formed upon it, near its upper end, which rests upon the upper end of the hollow pedestal F, within which said shaft revolves, and which is formed upon or rigidly attached to the case G, permanently attached to the platform A or to the frame-work of the machine.

To the lower end of the shaft E, within the case G, is attached a gear-wheel, H, the teeth of which mesh into the teeth of the curved segmental rack or gear-wheel I, which is pivoted within and to the case G, and to which a reciprocating movement is communicated from a crank or equivalent device, by means of a connecting-rod, J, the outer end of which is connected to said toothed segment by a globe-wrist connection or joint, K, so as not to be affected by the positions of the various parts of the machine in passing over uneven ground. This construction renders the rake peculiarly adaptable to machines having flexible finger-bars.

L is a spring, one end of which is attached to the bracket D, and the other end of which hooks upon the hook or pin M, attached to the journal of the rake-head C, which pin enters a slot or notch in the bearing of said journal, so as to act as a stop, to prevent the rake-head from being revolved by the action of the spring L so far as to bring the rake-teeth B into contact with the platform A.

N is a finger attached to or formed upon a sleeve, placed upon the end of the journal of the rake-head C, and which is kept in place by a pin, P, passing through a notch or slot in said sleeve and entering the said journal, as shown in Figs. 1, 3, and 4.

O is a small plane or platform, attached to the upper end of the hollow pedestal F, in such a position that as the shaft E, bracket D, and rake B C are moved back and forth, the finger N may move back and forth along the said plane O, said finger being so connected to the rake-head C, as before described, that when the rake is moving in the direction to sweep the grain from the platform A the finger N may slide loosely along the said plane; but when the rake is moving back, the finger N presses upon the plane O, and partially revolves the rake-head C, so as to raise the fingers B away from the platform A until the finger N drops from the end of the platform O, allowing the fingers B to again drop into operating position.

If desired, the plane O may be adjustably attached to the pedestal F by means of a sleeve and set-screw, so as to regulate the height to which the fingers B are raised above the platform A when moving back.

Having thus described my invention, I claim as new and desire to secure by Letters Patent—

1. The case G and hollow pedestal F, for containing and supporting the gearing that operates the rake, substantially as herein shown and described.

2. The combination of the connecting-rod J, internally-toothed segment I, gear-wheel H, shaft E, bracket D, and rake-head C with each other, and with the hollow pedestal F and case G, substantially as herein shown and described, and for the purpose of operating the rake B C.

3. The spring L, attached at one end to the bracket D, and at the other end to the rake-head C by the pin M, passing through a slot in the journal of the rake-head, in combination with the finger N and fixed plane O, all arranged and operating as described, for the purpose specified.

4. The combination of the finger N, stop-pin P, and plane O with the rake-head C and hollow pedestal F, whether said plane be stationary or adjustable, substantially as herein shown and described, and for the purpose set forth.

GEORGE BLAKE.

Witnesses:
 GEO. JOVEYS,
 JAMES ANDERSON.